(12) United States Patent
Milazar et al.

(10) Patent No.: US 12,378,892 B2
(45) Date of Patent: Aug. 5, 2025

(54) SEALING DEVICE WITH DISPLACEABLE ABUTMENT

(71) Applicant: Siemens Energy Global GmbH & Co. KG, Bayern (DE)

(72) Inventors: Mirko Milazar, Oberhausen (DE); Matthew Gent, Jupiter, FL (US); Markus Raben, Recklinghausen (DE); Patrick M. Ritchie, Hobe Sound, FL (US); Stefan Wanjura, Oberhausen (DE); Kunyuan Zhou, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 18/682,474

(22) PCT Filed: Jul. 12, 2022

(86) PCT No.: PCT/EP2022/069409
§ 371 (c)(1),
(2) Date: Feb. 9, 2024

(87) PCT Pub. No.: WO2023/020748
PCT Pub. Date: Feb. 23, 2023

(65) Prior Publication Data
US 2024/0353005 A1    Oct. 24, 2024

Related U.S. Application Data

(60) Provisional application No. 63/234,940, filed on Aug. 19, 2021.

(30) Foreign Application Priority Data

Oct. 11, 2021 (EP) ..................... 21201947

(51) Int. Cl.
F01D 11/00 (2006.01)
F16J 15/08 (2006.01)
F01D 9/02 (2006.01)

(52) U.S. Cl.
CPC ......... F01D 11/005 (2013.01); F16J 15/0887 (2013.01); *F01D 9/023* (2013.01);
(Continued)

(58) Field of Classification Search
CPC .... F01D 9/023; F01D 11/005; F05D 2240/55; F05D 2240/57; F05D 2260/38; F16J 15/0887; F02C 7/28
See application file for complete search history.

(56) References Cited

U.S. PATENT DOCUMENTS 8,201,834 B1   6/2012  Liang
8,398,090 B2 * 3/2013  McMahan ............... F01D 9/023
                                                    277/643

(Continued)

OTHER PUBLICATIONS

PCT International Search Report and Written Opinion of International Searching Authority mailed Oct. 10, 2022 corresponding to PCT International Application No. PCT/EP2022/069409 filed Jul. 12, 2022.

*Primary Examiner* — Nicholas L Foster
(74) *Attorney, Agent, or Firm* — Wolter Van Dyke Davis, PLLC

(57) ABSTRACT

A flat shaped sealing device for sealing a gap between two parts having a sealing length and a sealing width from one side edge to the opposite side edge of at most 0.2-times the sealing length and having a sealing thickness from a bottom side to a top side of at most 0.2-times the sealing width. The sealing device includes a head section and an adjacent main section. The head section includes an abutment and a spring, wherein the abutment is displaceable towards the main (Continued)

section and the spring is therefore arranged between the abutment and the main section and is able to exert a force on the abutment.

16 Claims, 3 Drawing Sheets

(52) U.S. Cl.
CPC ...... *F05D 2240/55* (2013.01); *F05D 2240/57* (2013.01); *F05D 2260/38* (2013.01)

(56) References Cited

U.S. PATENT DOCUMENTS

| | | | | |
|---|---|---|---|---|
| 8,562,000 B2* | 10/2013 | Moehrle | ............... | F01D 11/005 |
| | | | | 277/644 |
| 9,752,607 B2* | 9/2017 | Muskat | ............... | F02C 7/28 |
| 9,759,079 B2* | 9/2017 | Sippel | ............... | F01D 5/24 |
| 10,156,148 B2* | 12/2018 | Crane | ............... | F01D 25/30 |
| 10,301,955 B2* | 5/2019 | Vetters | ............... | F16J 15/022 |
| 10,584,605 B2* | 3/2020 | Sippel | ............... | F01D 25/26 |
| 11,536,150 B2* | 12/2022 | Kono | ............... | F02C 7/28 |
| 2007/0009350 A1 | 1/2007 | Tothill | | |
| 2009/0072497 A1* | 3/2009 | Kunitake | ............... | F02C 7/28 |
| | | | | 277/644 |
| 2010/0201080 A1* | 8/2010 | Kunitake | ............... | F02C 7/28 |
| | | | | 277/641 |
| 2011/0304104 A1* | 12/2011 | McMahan | ............... | F16J 15/061 |
| | | | | 277/637 |
| 2013/0181413 A1* | 7/2013 | McMahan | ............... | F16J 15/0887 |
| | | | | 277/641 |
| 2014/0327213 A1* | 11/2014 | Muskat | ............... | F01D 9/023 |
| | | | | 164/90 |
| 2016/0290165 A1* | 10/2016 | Crane | ............... | F01D 25/12 |
| 2016/0348521 A1* | 12/2016 | Sippel | ............... | F01D 11/005 |
| 2017/0370240 A1* | 12/2017 | Sippel | ............... | F01D 5/225 |
| 2018/0149029 A1* | 5/2018 | Vetters | ............... | F16J 15/022 |
| 2021/0189896 A1* | 6/2021 | Kono | ............... | F02C 7/28 |

* cited by examiner

SEALING DEVICE WITH DISPLACEABLE ABUTMENT

CROSS REFERENCE TO RELATED APPLICATIONS

This application is the US National Stage of International Application No. PCT/EP2022/069409 filed 12 Jul. 2022, and claims the benefit thereof, which is incorporated by reference herein in its entirety. The International Application claims priority benefit to U.S. Application No. 63/234,940 filed 19 Aug. 2021 and to European Application No. EP21201947 filed 11 Oct. 2021.

FIELD OF INVENTION

The invention relates to a sealing device for sealing a gap which is formed between two components.

BACKGROUND OF INVENTION

In gas turbines platforms of stator vanes limit the annular flow path for the hot gas generated in combustion chambers. The platforms of adjacent stator vanes are arranged one beside the other forming small gaps therebetween. The gaps are needed for enabling thermal growth and movement of the stator vanes and their platform induced by thermal changes. In order to prevent hot gas being lost through these gaps and to avoid damage to carrier components arranged on the rear, it is known to seal these gaps with the aid of a sealing strip element, which is seated in two mutually opposite platforms grooves. At the same time, the rear area is supplied with cooling air that is needed for cooling the turbine parts. For achieving an improved sealing, EP0852659B1 proposed that the sealing sheets have a toothed surface on one side.

It is obvious, that a sealing strip element has two opposite ends. Next, due to the thermal growth and tolerances it is necessary to keep a free space within the available length of the gap to mount the sealing strip element. Therefore, the length of the sealing strip element is always less than the length of the gap (assuming that there is no open end at either end of the gap).

The available space in the longitudinal direction of the gap could lead to a movement of the sealing strip element along the gap. First, this could cause wear and a reduction of the lifetime. Second, this could lead to a remaining, not-covered gap at least at one end of the sealing strip element leading to an unwanted leakage.

In the continuous attempt to reduce the amount of cooling air for aiming an increased efficiency of the gas turbine a new seal element design is needed.

SUMMARY OF INVENTION

Hence, it is therefore an objective of the invention to provide a long-life sealing device with further increased sealing properties.

Accordingly, a first objective is achieved with a sealing device comprising the features of the independent claim. In the depending claims further preferred features are given which can be arbitrarily combined.

The generic sealing device is intentionally used for sealing a gap between two adjacent parts. Here, advantageously the sealing device is used within a gas turbine to seal a gap between adjacent platforms of stator vanes or between adjacent ring segments.

The sealing device has a flat/plate-like, striped shape extending along a longitudinal direction from a foot end to a head end defining a sealing length. The to be sealed gap could have preferably a straight course. As the sealing device is intentionally used in a gas turbine, for example between ring segments the gap could also have a slightly bent course, which should be covered by the wording of a longitudinal direction. If the sealing device is bent, it is assumed that the radius of the course is at least the sealing length or preferably at least twice the sealing length of the sealing device.

A sealing width is defined as distance from one side edge to an opposite side edge of the sealing device. The sealing device comprises further a bottom side and an opposite top side, wherein the distance between the bottom side to the top side defines a sealing thickness. According to the striped shape the sealing width is at most 0.2-times the sealing length and the sealing thickness is at most 0.2-times the sealing width.

The sealing device comprises at the head end a head section and an adjacent main section, wherein the main section extends along the longitudinal direction over the majority part and the head section next to the main section in the longitudinal direction over a smaller portion of the sealing length.

It is not relevant, if the sealing device comprises a further specific design at the foot end different to the design of the main section. But it is advantageous if the main section extends up to the foot end without any additional feature between the main section and the foot end.

To enhance the sealing properties of the sealing device, the inventive solution makes use of a head section comprising an abutment and a spring. The abutment is arranged at the head end. Thereby the abutment is displaceable towards the main section.

The spring is arranged between the abutment and the main section. The spring is supported by the main section and exerts a force on the abutment in a direction from the main section to the head end.

It must be noted that the abutment is arranged directly at the head end spaced apart from the main section in longitudinal direction. Next, it is obvious, that the spring acts as a force in the longitudinal direction (which is the course of the to be sealed gap).

With the new head section additional to the main section, the position of the sealing device within the gap could be fixed. Here, it is possible to enable a clamped (along the longitudinal direction) perfect fitting into the gap. Thereby, an uncertain leakage at a foot end could be minimized by the intended contact of the abutment at one end of the gap. This will also lead to a reduced wear due to the fixed position of the sealing device. Any thermal growth could be compensated by the spring with the movable abutment.

As the head section comprises the spring and the abutment the sealing feature is reduced compared to the main section. Therefore, the length of an advantage head section is at most 2-times the sealing width and at most 0.2-times the sealing length.

It is possible, that the sealing device has along the longitudinal direction a curved shape. As the sealing has to fit into the respective seating at the parts to close the gap between the parts. Therefore, the shape in longitudinal direction is defined by the usage. But, if possible, it is an advantage if the main section or in particular the sealing device is linear in the longitudinal direction.

To enable a beneficial sealing effect, especially if used in a gas turbine, it is further advantageous to implement a riffle structure on the bottom side and/or on the top side of the main section. The riffle structure could be continuous or interrupted.

As the sealing device has only a low sealing thickness and therefore only some space in that direction is available for the spring, it is a further advantage, if the spring has a meandering shape between the abutment and the main section.

Regarding the arrangement of the spring between the abutment and the main section in principle three different options are possible.

In a first solution the spring is firmly connected with the abutment. At the other end the spring is supported by the main section. Here, it is necessary to mount a piece with the main section together with a piece with the abutment and the spring. Especially this solution is a good compromise between a simplified production of the parts and a mounting without any difficulties.

Second, it is possible to use three pieces, the main section, an abutment and a spring mounted between the main section and the abutment. Here, the production of the parts is less complex.

At a third advantage embodiment no further assembly to get the sealing device is necessary. Therefore, the spring is firmly connected with the main section and firmly connected with the abutment.

If less flexibility is necessary between the abutment and the main section it is advantage to use a spring with the shape analog a bending beam. Therefore, the spring needs to be connected with one end at one side edge of the main section. The opposite end of the spring forms the abutment. Here, it is possible to use one spring extending from one side edge connected with the main section to the other side edge with a free end as abutment. It is also possible to use two springs, each firmly connected with one side edge extending opposite to each other with the abutment in the middle of the sealing device.

A particular advantageous embodiment comprises further a cover, which is arranged at the top side and is firmly connected with the main section. Thereby the cover extends almost up to the head end and over the sealing width. To enable an advantage sealing at the head section, the spring—in particular the free space at the spring—has to be covered by the cover.

In case, the sealing device is made as one piece without further mounting and as there must be no firm connection between the abutment and the cover, it is advantage to produce this embodiment by additive manufacturing.

As result, the head section comprises the cover with a reduced thickness compared to the main section. To provide sufficient space for the spring and the abutment, it is advantageous if the thickness of the cover is at most 0.3-times the sealing thickness.

As the abutment is arranged at the head end, preferably the abutment protrudes beyond the cover to the head end depending on its displacement, so that the abutment is at least partly covered by the cover. As result, an uncertain leakage also at a head end could be minimized.

Even if the cover has a reduced thickness, it is still an advantage to implement a riffle structure at the top side. It is obvious that the depth of the riffle structure could not be as much as it is possible at the main section. But when using the riffle structure it is advantage if the riffle structure of the main section aligns with the riffle structure of the cover.

Next, it is possible that the sealing device is arranged with its head section cross to a further sealing element. If the further sealing element comprises also a riffle structure and the riffle structure of the sealing element faces the top side of the sealing device at the head section, it is advantage if the cover is flat on the top side.

To enhance the sealing effect at the head section by covering the spring with the cover, it is further advantage to extend the cover at both side edges down to the bottom side.

To enable a guiding of the abutment, especially if not given by the seating at the parts (where the sealing device is intentionally mounted) it is advantage if the cover provides a guide for the abutment supported by the rims of the cover at both side edges.

A further improvement of the sealing is enabled if the abutment has at least one locally increased cross section fitting into the guide provided by the cover. This reduces a leakage from the bottom side between the spring/abutment and the cover to the top side (or vice-versa).

The abutment intentionally extends beyond the cover (to enable the displacement towards the main section). To reduce any further leakage at the head end, it is further advantage, if the abutment has at the head end at the position not covered by the cover the sealing thickness and the sealing width.

BRIEF DESCRIPTION OF THE DRAWINGS

In the following figures some advantageous embodiments for an inventive sealing device are shown.

DETAILED DESCRIPTION OF INVENTION

Figure 1:
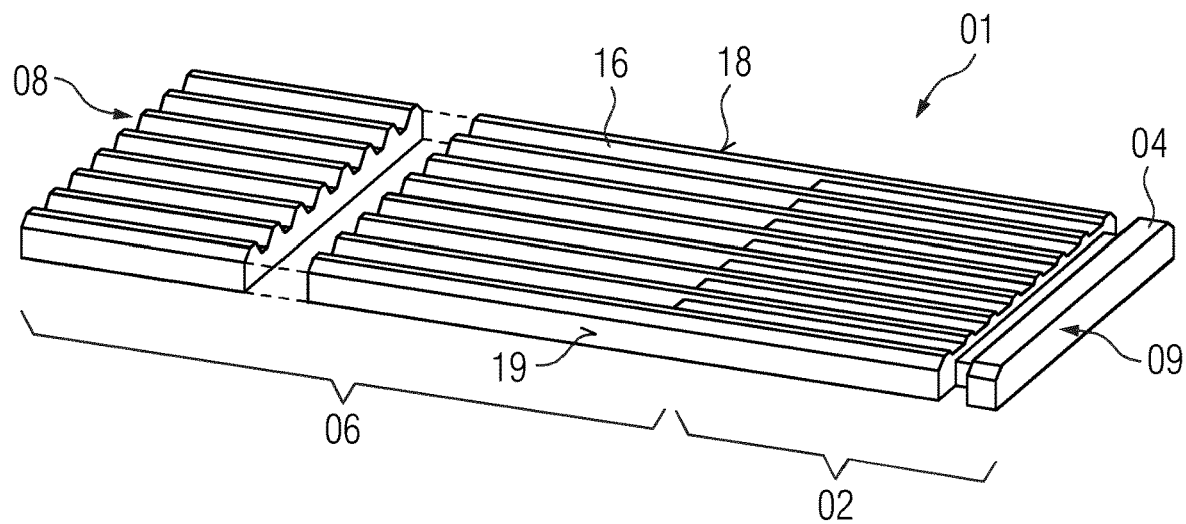
FIG. 1 shows a first example for a sealing device with a continuous riffle structure.
Figure 2:
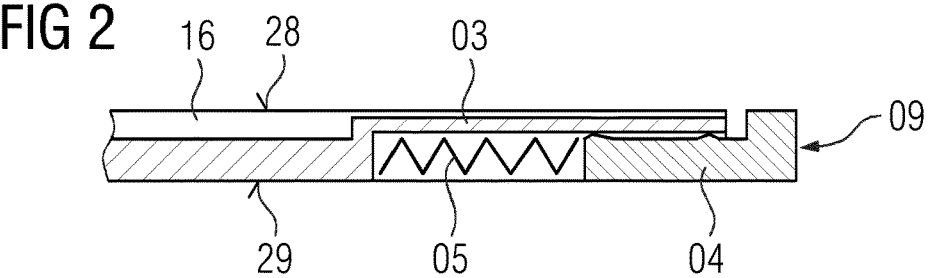
FIG. 2 shows a section cut through the head section of the sealing device of FIG. 1.

In FIG. 1 a first exemplary embodiment of an inventive sealing device 01 is shown in a 3D view on the top side. The sealing device 01 has an elongated flat shape extending in a longitudinal direction over a sealing length from a bottom end 08 (left side in the figure) to a head end 09. On the back side of the figure an edge 18 and at the front side of the figure the opposite edge 19 are arranged. The distance between the edges 18,19 defines the sealing width. From the drawing it is obvious, that the sealing length of the sealing device 01 is much larger than shown in the figure. Here, it is requested, that the sealing length is at least 5-times the sealing width. Next, the sealing device 01 has a top side 28 and an opposite bottom side 29 (see FIG. 2). At the top side 28 a riffle structure 16 extending in the longitudinal direction is arranged. The distance between the bottom side 29 and the top side 28 defines a sealing thickness, which is less than 0.2-times the sealing width.

Figure 3:
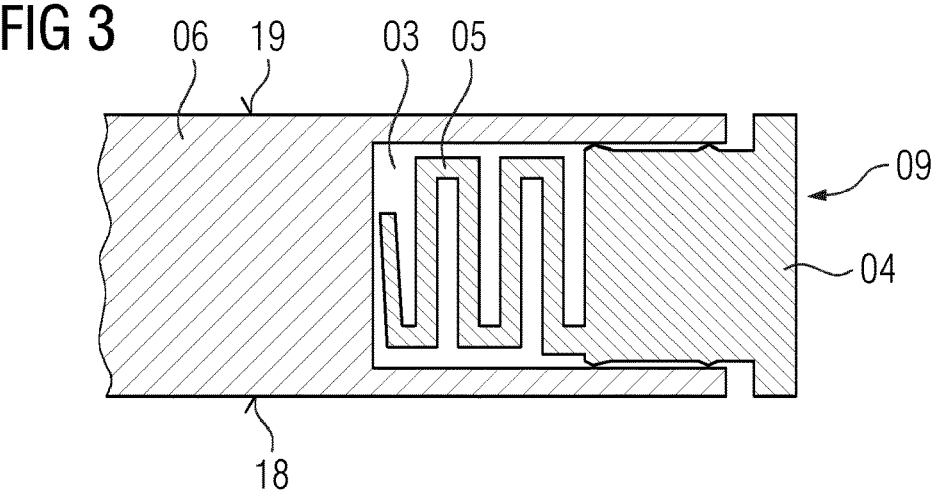
FIG. 3 shows a view from the bottom side on the head section of the sealing device of FIG. 1.

Relevant for the invention is the arrangement of a head section 02 at the head end 09 next to a main section 06. This special head section 02 enables a fixed position of the sealing device 01 in the longitudinal direction. As it could be seen in FIG. 2 and FIG. 3 the head section comprises a cover 03 at the top side 28 and an abutment 04 below the cover 03 extending beyond the cover 03 at the head end 09. The abutment 04 of this embodiment is guided by the cover 03, which therefore extends on both edges 18, 19 down to the bottom side 29. To reduce any leakage through the gap at the intended location between at least two parts, the last end of the abutment 04 at the head end 09 has the same width and height as the sealing width and the sealing thickness.

In this embodiment the sealing device 01 is built from two pieces. One piece comprises the main section 06 and the cover 03, wherein the other piece comprises the abutment with an integral spring 05. The spring 05 has a meandering shape and is arranged between the abutment 04 and the main section 06.

This spring 05 enables a force on the abutment 04 away from the main section 06, whereby in a mounted position the abutment 04 can move towards the main section 06.

To provide a beneficial sealing the abutment 04 has at two positions (close to the end facing the spring and close to the end of the cover facing the head end) an increased cross section tight fit inside the space provided by the cover 03.

Figure 4:
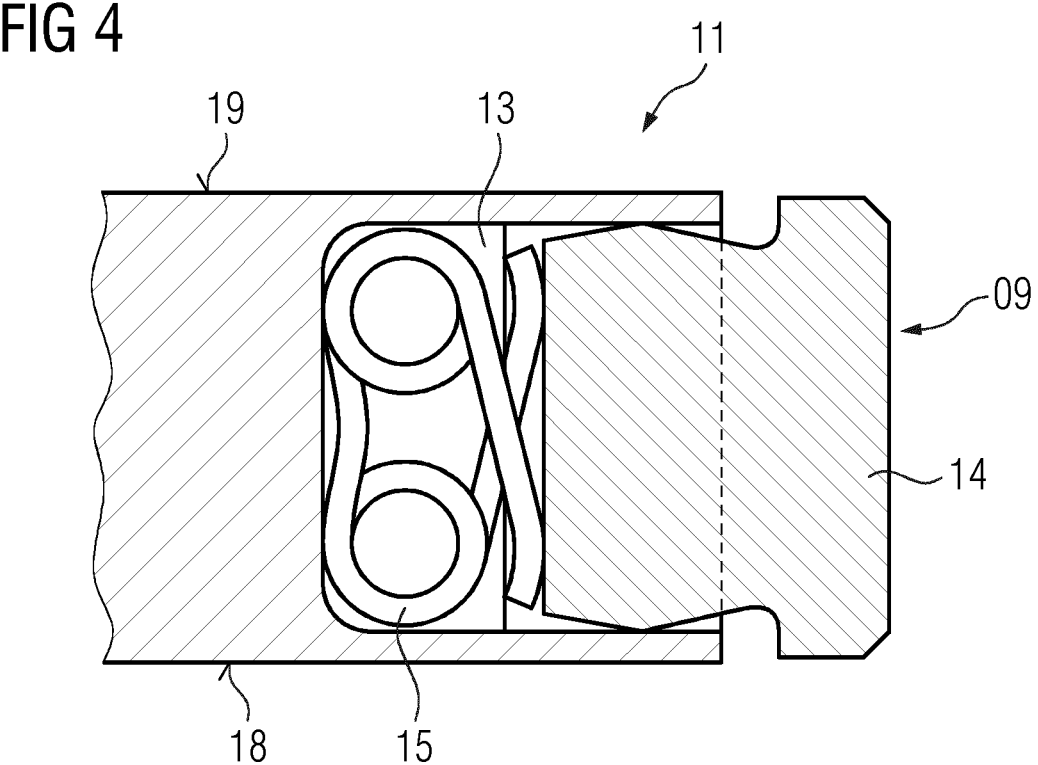
FIG. 4 shows a view analog FIG. 3 of a second example for a sealing device with a separate spring.

In FIG. 4 a further embodiment of a sealing device 11 is shown. The abutment 14 is similar to the solution before. But instead of an integral solution, here a spring 15 is mounted between the abutment 14 and the main section. As important feature the spring 15 is covered by the cover 13.

Figure 5:
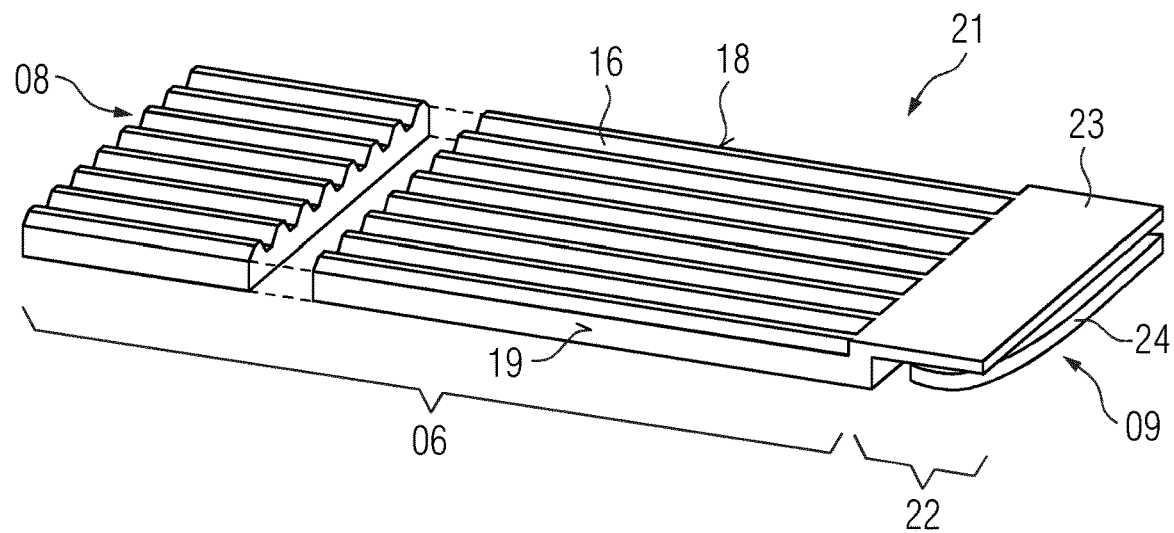
FIG. 5 shows a third example for a sealing device with integral spring and abutment.

FIG. 5 shows a third embodiment of a sealing device 21. The main section 06 is equal to the solution of FIG. 1. Also, there is the cover 23 firmly attached to the main section 06. To avoid any mounting of separate pieces, here the sealing device is made of one integral piece.

Figure 6:
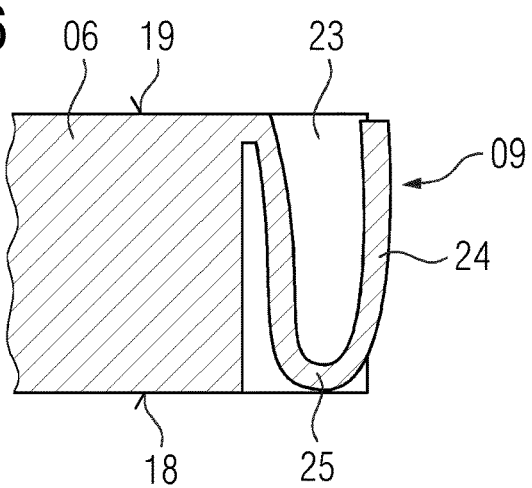
FIG. 6 shows a view from the bottom side on the head section of the sealing device of FIG. 5.

Therefore, the head section 22 comprises a spring 25 with a U-shape—as it could be seen best in FIG. 6—and the abutment 24 as the end of the spring 25 facing the head end 09. The spring 25 is integrally attached to the main section 06 at one edge 19. To provide the flexibility of the spring 25 and the ability of the abutment 24 to move towards the main section 06 a minimum free distance (determined by the production possibilities) to the cover 23 is necessary.

Even if the cover 23 does not provide a side rim at the edges 18, 19 of the head section 22, the cover 23 still covers the spring 25 and reduces the leakage at the head end 09.

Figure 7:
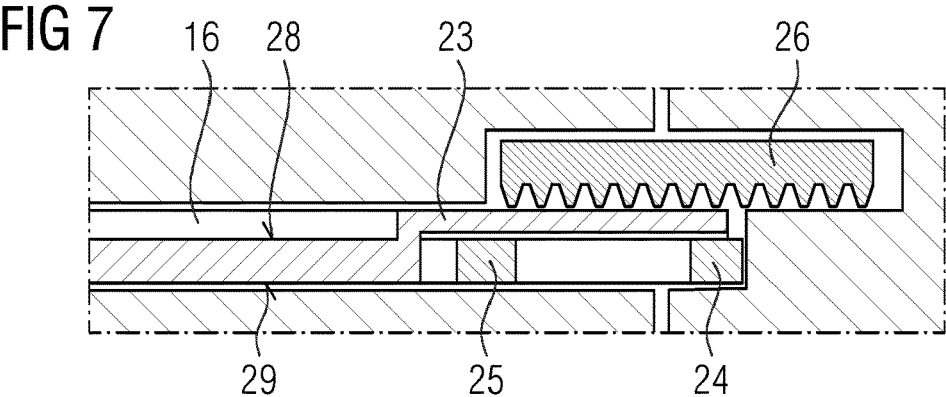
FIG. 7 shows a section cut through an arrangement at the head end of the sealing device of FIG. 5 with two adjacent parts and a further sealing stripe.

In FIG. 7 an arrangement of the sealing device 21 with the head section 22 is shown. Here, in the area of the head section 22 a further gap is arranged between a part extending along the sealing device 21 and another part located beyond the end of the sealing device 21. To seal this further gap a sealing stripe 26 is arranged cross to the longitudinal direction of the sealing device 21, wherein the sealing stripe 26 has also a riffle structure at the lower side. To enable a beneficial sealing between the sealing stripe 26 and the sealing device 21 the cover 23 has at the top side 28 a flat surface.

The invention claimed is:

1. A sealing device, for sealing a gap between two parts, comprising:
    a flat shape and extending along a longitudinal direction over a sealing length from a foot end to a head end and having a sealing width from one side edge to an opposite side edge of at most 0.2-times the sealing length and having a sealing thickness from a bottom side to a top side of at most 0.2-times the sealing width; and comprising a head section arranged at the head end and an adjacent main section spaced apart from the head end,
    wherein the head section comprises an abutment and a spring, wherein the abutment is displaceable towards the main section, and wherein the spring is arranged between the abutment and the main section and is adapted to exert a force on the abutment.

2. The sealing device according to claim 1, wherein the length of the head section is at most 2-times the sealing width and at most 0.2-times the sealing length.

3. The sealing device according to claim 1, wherein the main section and/or the sealing device is linear along the longitudinal direction.

4. The sealing device according to claim 1, wherein a riffle structure is arranged at the bottom side of the main section.

5. The sealing device according to claim 1, wherein the spring has a meandering shape.

6. The sealing device according to claim 1, wherein the spring is firmly connected with the abutment and is supported by the main section; or wherein the spring mounted between the abutment and the main section.

7. The sealing device according to claim 1, wherein the spring is firmly connected with the abutment and with the main section.

8. The sealing device according to claim 7, wherein the spring is designed as a bending beam and is connected to the main section via a side edge, wherein a free end of the spring forms the abutment.

9. The sealing device according to claim 8, wherein two springs are arranged opposite to each other each connected with the main section via a side edge, wherein the free end of each spring forms an abutment.

10. The sealing device according to claim 1, wherein the head section comprises a cover, which is arranged at the top side and is firmly connected with the main section and covers the spring.

11. The sealing device according to claim 10, wherein a cover thickness of the cover is at most 0.3-times the sealing thickness; and/or wherein the abutment protrudes beyond the cover at the head end.

12. The sealing device according to claim 10, wherein the cover has a riffle structure according to a riffle structure of the main section; or wherein the cover is flat on the top side.

13. The sealing device according to claim 10, wherein the cover extends at both side edges down to the bottom side.

14. The sealing device according to claim 13, wherein the cover provides a guide for the abutment, which has at least one locally increased cross section fitting into the guide enabling a sealing between the cover and the abutment.

15. The sealing device according to claim 10, wherein the abutment has adjacent to the head end the sealing width and the sealing thickness.

16. The sealing device according to claim 12, wherein the depth of the riffle structure is reduced.

* * * * *